US011867389B2

(12) United States Patent
Lin et al.

(10) Patent No.: US 11,867,389 B2
(45) Date of Patent: Jan. 9, 2024

(54) LIGHTING APPARATUS

(71) Applicant: XIAMEN LEEDARSON LIGHTING CO.,LTD, Fujian (CN)

(72) Inventors: Ruixiang Lin, Fujian (CN); Yunbiao Wu, Fujian (CN); Chuanbao Ye, Fujian (CN); Lei Zhang, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 15 days.

(21) Appl. No.: 17/377,197

(22) Filed: Jul. 15, 2021

(65) Prior Publication Data

US 2022/0026042 A1 Jan. 27, 2022

(30) Foreign Application Priority Data

Jul. 24, 2020 (CN) ........................ 202021491368.X
Jul. 24, 2020 (CN) ........................ 202021491646.1
Jul. 24, 2020 (CN) ........................ 202021492175.6

(51) Int. Cl.
*F21V 19/00* (2006.01)
*F21V 23/04* (2006.01)
*F21V 23/00* (2015.01)
*F21V 5/00* (2018.01)
*F21V 3/00* (2015.01)
*F21Y 115/10* (2016.01)

(52) U.S. Cl.
CPC ................ *F21V 5/007* (2013.01); *F21V 3/00* (2013.01); *F21V 19/003* (2013.01); *F21V 23/009* (2013.01); *F21V 23/04* (2013.01); *F21Y 2115/10* (2016.08)

(58) Field of Classification Search
CPC ...... F21V 21/047; F21V 21/049; F21V 5/007; F21V 23/009; F21V 19/003
See application file for complete search history.

(56) References Cited

U.S. PATENT DOCUMENTS 7,347,582 B1 * 3/2008 Kung .................... F21V 21/145 362/399
11,287,120 B2 * 3/2022 Jiang ....................... F21V 15/01
2010/0135006 A1 * 6/2010 Huang .................. F21V 19/001 362/185
2014/0347853 A1 * 11/2014 Avina Silva .......... F21V 19/003 362/240
2015/0055353 A1 * 2/2015 Hutchens ............... F16M 13/02 362/370
2018/0038578 A1 * 2/2018 Son ........................... F21V 3/00
2018/0259164 A1 * 9/2018 Clements ................ F21S 8/026
2020/0370737 A1 * 11/2020 Yang ....................... F21S 8/026
2022/0018517 A1 * 1/2022 Luo ........................... F21V 7/04

* cited by examiner

*Primary Examiner* — Eric T Eide
(74) *Attorney, Agent, or Firm* — Chun-Ming Shih; LANWAY IPR SERVICES

(57) ABSTRACT

A lighting apparatus includes a light source, a base plate, a light passing plate and a control module. The base plate has a lateral wall, a bottom plate and a top rim. The lateral wall and the bottom plate form a concave container. The light source is disposed on the bottom plate. A bottom edge of the lateral wall is connected to the bottom plate. A top edge of the lateral wall is connected to the top rim. The light passing plate is attached to the top edge of the lateral wall. a control module. The control module has a sensor and a control circuit. The sensor and the control circuit are placed on two sides of the top rim. The control circuit is connected to the sensor via a through hole of the top rim.

15 Claims, 9 Drawing Sheets

LIGHTING APPARATUS

FIELD

The present invention is related to a lighting apparatus, and more particularly related to a lighting apparatus with a compact design and small signal interference.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

SUMMARY

In some embodiments, a lighting apparatus includes a light source, a base plate, a light passing plate and a control module.

The base plate has a lateral wall, a bottom plate and a top rim.

The lateral wall and the bottom plate form a concave container.

The light source is disposed on the bottom plate.

A bottom edge of the lateral wall is connected to the bottom plate.

A top edge of the lateral wall is connected to the top rim.

The light passing plate is attached to the top edge of the lateral wall.

The control module has a sensor and a control circuit.

The sensor and the control circuit are placed on two sides of the top rim.

The control circuit is connected to the sensor via a through hole of the top rim.

In some embodiments, the light passing plate is a diffusion plate for diffusing a light of the light source.

In some embodiments, the light passing plate has multiple lenses corresponding to multiple LED modules of the light source placed respectively below the multiple lenses.

In some embodiments, the bottom plate has multiple grooves for selectively disposing multiple light strips of the light source.

In some embodiments, a portion of the grooves are not disposed with light strips.

In some embodiments, the grooves are spaced evenly.

In some embodiments, the grooves are separated by multiple rim bars on the bottom plate.

In some embodiments, the bottom plate has multiple auxillary bars placed perpendicular to the multiple rim bars.

In some embodiments, the base plate is made of plastic material.

In some embodiments, the base plate is a single plastic unit made via a same manufacturing process.

In some embodiments, the top edge of the lateral wall has multiple protruding structures for containing glue used for attaching the light passing plate and the bottom plate.

In some embodiments, the control module is placed in a driver box. The driver box is attached outside the lateral wall. The driver box and the light source are placed on two sides of the lateral wall.

In some embodiments, a through hole is disposed on the base plate for disposing a conductive path to electrically connect the control module and the light source.

The control module has a power circuit for providing a driving current to the light source.

In some embodiments, the driver box is a container formed on the base plate.

In some embodiments, a manual switch is placed aside the sensor.

The manual switch and the control circuit are placed on two sides of the top rim.

In some embodiments, the manual switch has a rotation switch for continuously adjust a light intensity of the light source.

In some embodiments, the manual further has a second switch for adjusting a light parameter of the light source.

In some embodiments, the rotation switch is combined with the second switch to form a combination selection to control the light source.

In some embodiments, the sensor is placed above a through hole of a limiting cover.

The limiting cover is placed on a rim hole of the top rim for keeping the sensor and the control circuit on two sides of the top rim.

In some embodiments, the light passing plate is a rectangular plate with four round corners.

DETAILED DESCRIPTION

Figure 8:
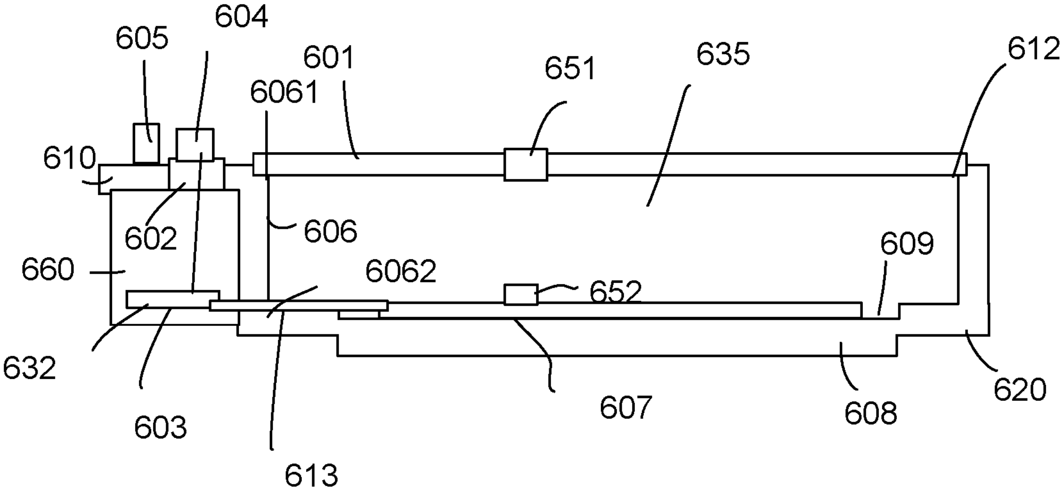
FIG. 8 shows another embodiment.

In FIG. 8, a lighting apparatus includes a light source 607, a base plate 620, a light passing plate 601 and a control module 632.

The base plate 620 has a lateral wall 606, a bottom plate 608 and a top rim 610.

The lateral wall 606 and the bottom plate 608 form a concave container 635.

The light source 607 is disposed on the bottom plate 608.

A bottom edge 6062 of the lateral wall 606 is connected to the bottom plate 608.

A top edge 6061 of the lateral wall 606 is connected to the top rim 610.

The light passing plate 601 is attached to the top edge 6061 of the lateral wall 606.

The control module 632 has a sensor 604 and a control circuit 603. The control circuit 603 may include a printed circuit board mounted with control and driver circuits. The driver circuits may convert an external power source like 110V AC power to a direct current driving power.

The sensor 604 and the control circuit 603 are placed on two sides of the top rim 610. In other words, at least a portion of the sensor 604 is above the top rim 610 to collect more information and the control circuit 603 is covered and concealed by the top rim 610.

The control circuit 603 is connected to the sensor 604 via a through hole 602 of the top rim 610.

In some embodiments, the light passing plate is a diffusion plate for diffusing a light of the light source. A light diffusion plate may be made by a transparent plate with surface processing for diffusing lights to soften the light.

In some embodiments, the light passing plate has multiple lenses 651 corresponding to multiple LED modules 652 of the light source placed respectively below the multiple lenses 651. Such design helps diffusing or condensing lights of the LED module 652.

In some embodiments, the bottom plate has multiple grooves 609 for selectively disposing multiple light strips of the light source 607.

Figure 7:
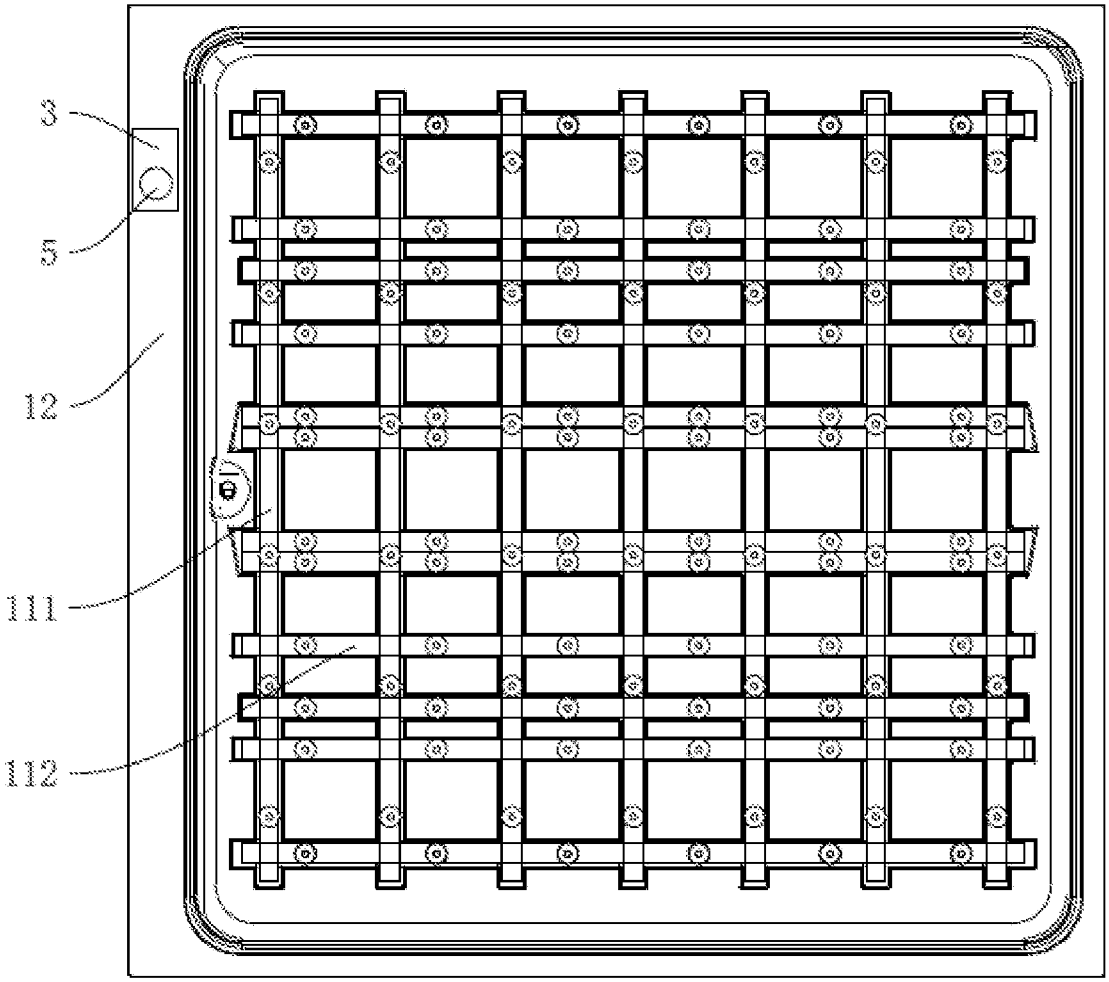
FIG. 7 shows a bottom plate with horizontal and vertical rim bars with unevenly.

In some embodiments, a portion of the grooves are not disposed with light strips. An example is shown in FIG. 7. There are multiple grooves but not every groove is placed with light strip. Under different requirements, different number of light strips are placed on the grooves that may not be arranged evenly, e.g. as shown in FIG. 7.

In some embodiments, the grooves are spaced evenly.

In some embodiments, the grooves are separated by multiple rim bars on the bottom plate. FIG. 7 show multiple rim bars are placed in such manner. Some are placed horizontally and some are placed vertically.

In some embodiments, the bottom plate has multiple auxillary bars placed perpendicular to the multiple rim bars.

In some embodiments, the base plate is made of plastic material.

In some embodiments, the base plate is a single plastic unit made via a same manufacturing process.

In some embodiments, the top edge of the lateral wall has multiple protruding structures for containing glue used for attaching the light passing plate and the bottom plate.

Figure 5:
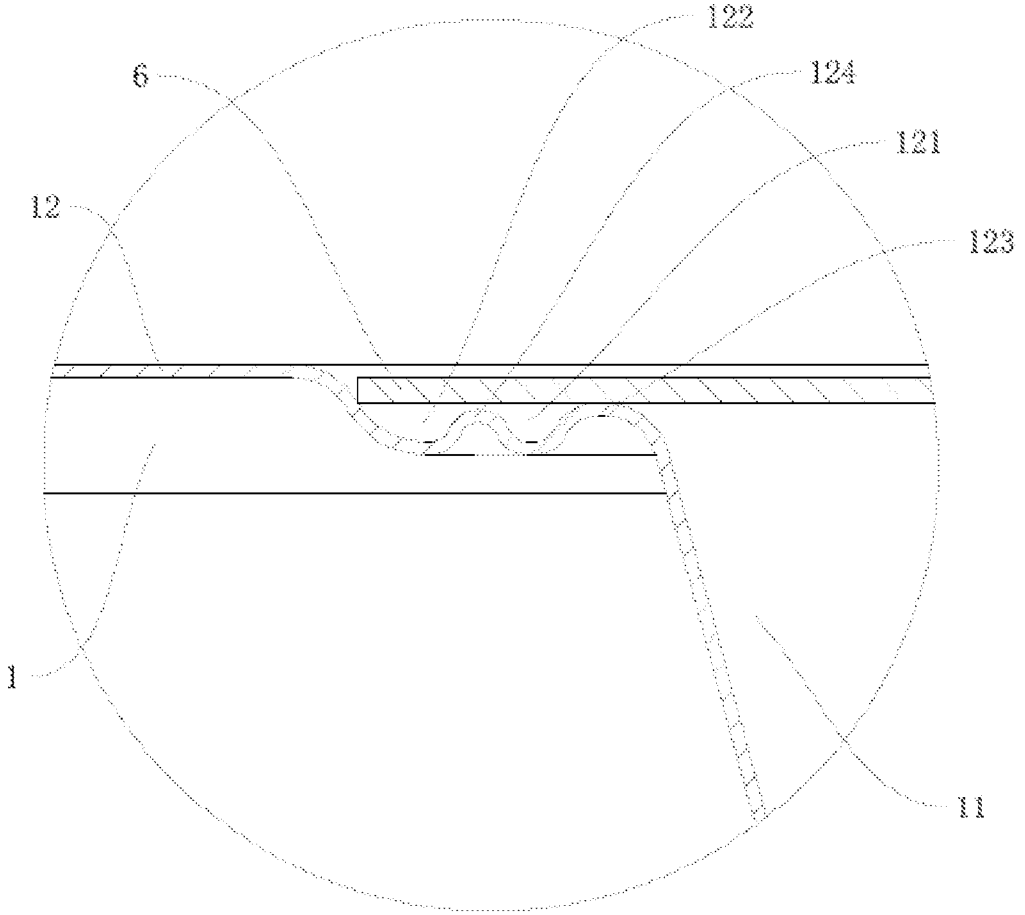
FIG. 5 shows a zoom-up of connection between a light passing plate and the base plate.

FIG. 5 show such a design. Two protruding structures 124, 123 form two grooves for containing glue so that the glue may firmly attach the light passing plate 6 to the base plate 12.

In some embodiments, the control module 632 is placed in a driver box 660. The driver box 660 is attached outside the lateral wall 660. The driver box 660 and the light source 652 are placed on two sides of the lateral wall 606.

In some embodiments, a through hole is disposed on the base plate for disposing a conductive path 613 to electrically connect the control module 632 and the light source 607.

The control module 632 has a power circuit for providing a driving current to the light source.

In some embodiments, the driver box is a container formed on the base plate. In other words, the base plate may be a plastic unit with multiple components mentioned above, like the lateral wall, the bottom plate and the driver box.

In some embodiments, a manual switch 605 is placed aside the sensor 604.

The manual switch 605 and the control circuit 603 are placed on two sides of the top rim 610.

Figure 9:
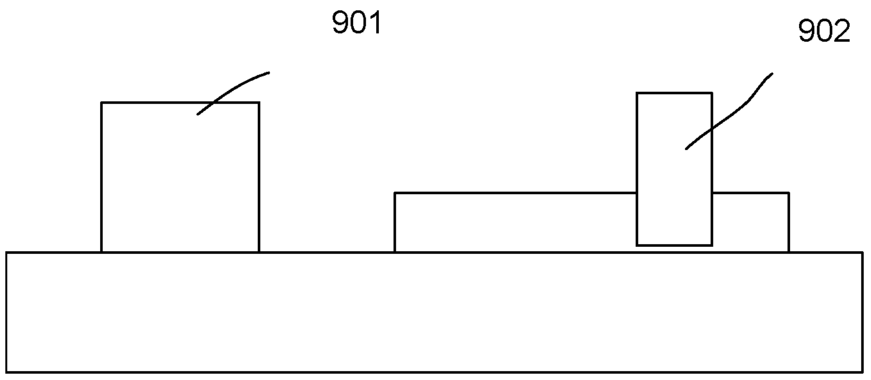
FIG. 9 shows a manual switch example.

In FIG. 9, the manual switch has a rotation switch 901 for continuously adjust a light intensity of the light source.

In some embodiments, the manual further has a second switch 902 for adjusting a light parameter of the light source.

In some embodiments, the rotation switch is combined with the second switch to form a combination selection to control the light source.

Figure 2:
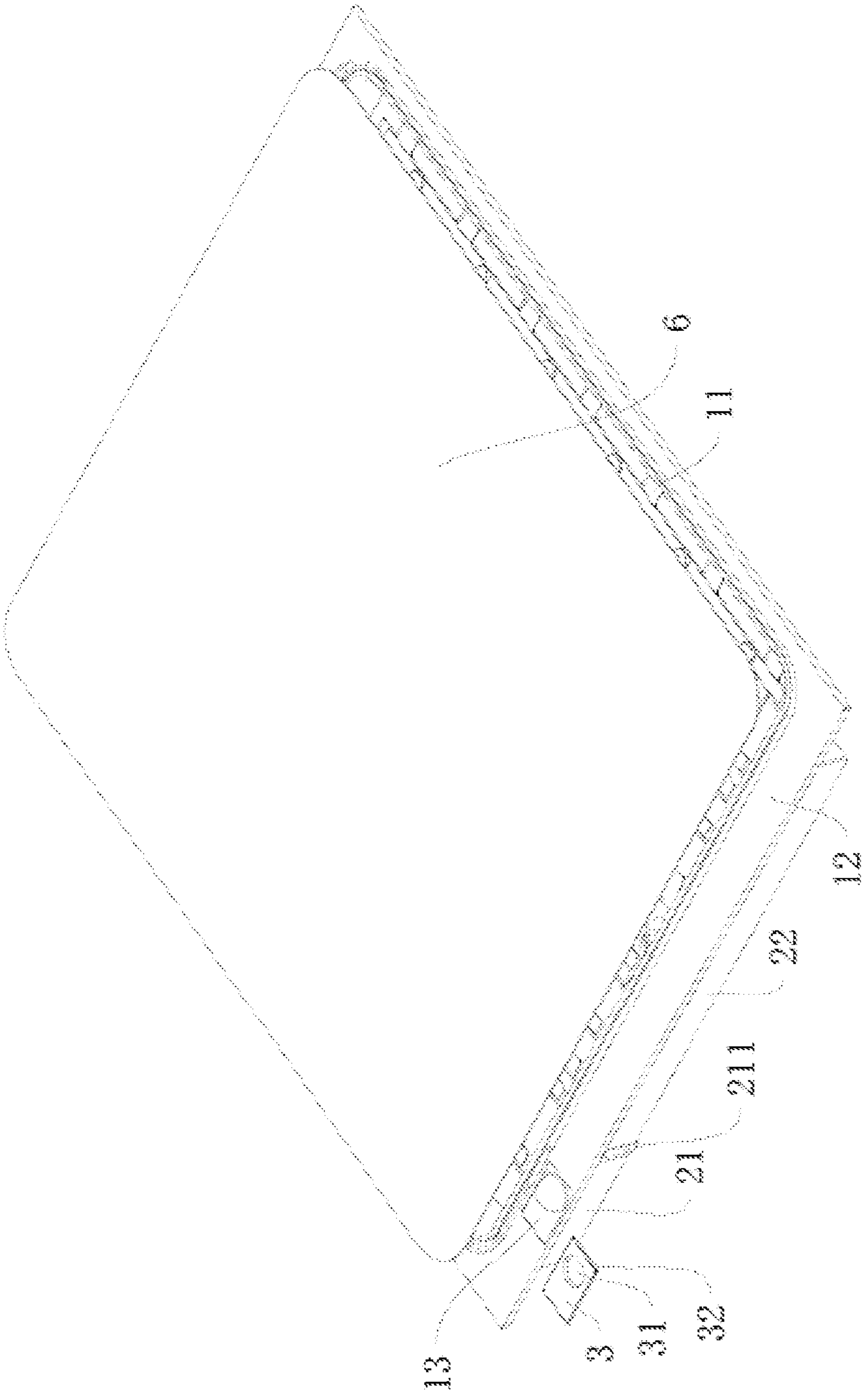
FIG. 2. shows an exploded view of the example in FIG. 1.

In FIG. 2, the sensor is placed above a through hole of a limiting cover 3.

The limiting cover is placed on a rim hole of the top rim for keeping the sensor and the control circuit on two sides of the top rim.

Figure 1:
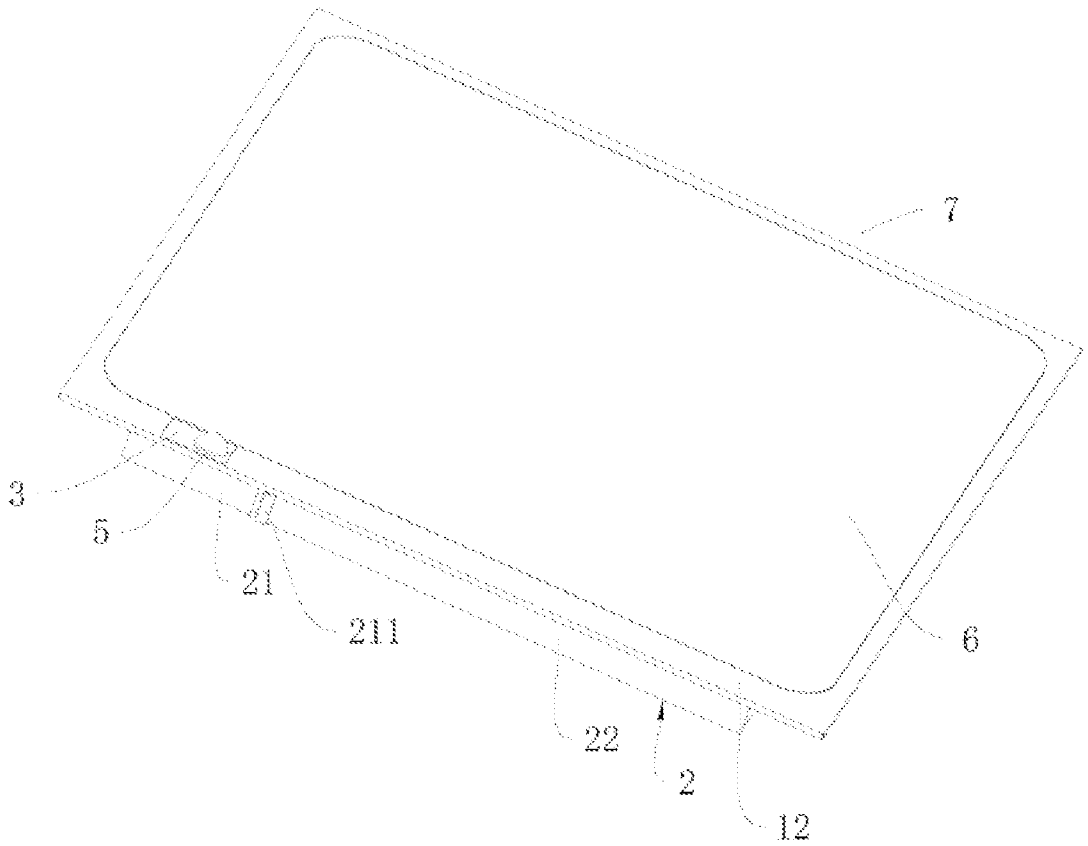
FIG. 1 shows a lighting apparatus embodiment.

In some embodiments, the light passing plate is a rectangular plate with four round corners, as shown in FIG. 1.

Please refer to FIG. 1. FIG. 1 shows a lighting apparatus embodiment.

In FIG. 1, the lighting apparatus 7 has a light passing plate 6. The light passing plate 6 is attached to a base plate 2.

The base plate 2 has a top rim 12. There is a first container 22 for holding a light source for emitting a light passing through the light passing plate 6. There is a lateral wall 211 for separating the first container 22 from a second container 21. The second container 21 contains a control module with a sensor 5 placed above a limiting cover 3.

Please refer to FIG. 2, which shows an exploded view of the example in FIG. 1.

In FIG. 2, the limiting cover 3 has a hole 31 and a plate for holding the sensor. The top rim has a through hole 13 for connecting a wire between the sensor and the control module. Other components with the same reference numerals among drawings refer to the same components and are not repeated again.

Figure 3:
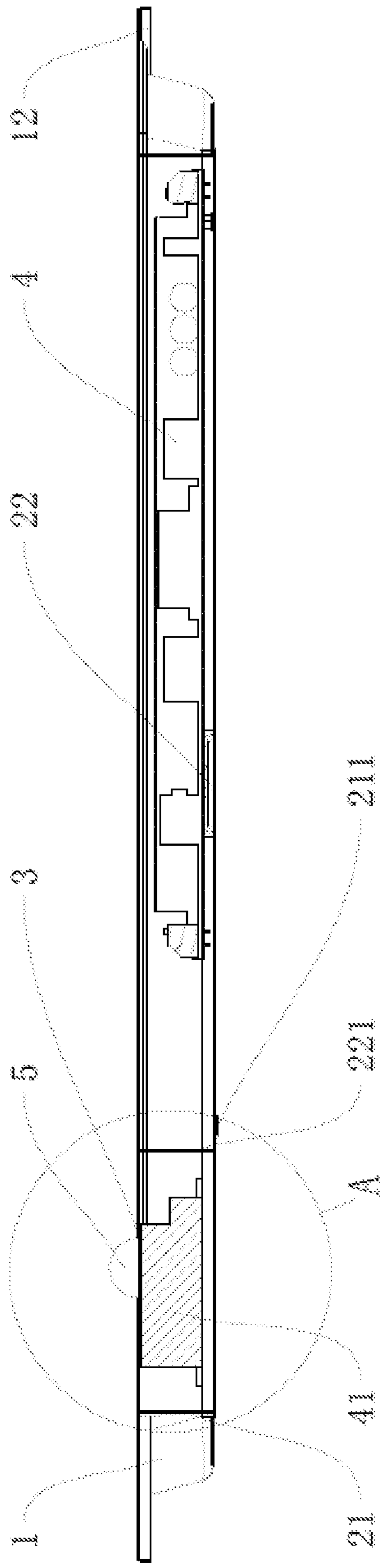
FIG. 3 shows a side view of the lighting apparatus in FIG. 1.

Please refer to FIG. 3, which shows a side view of the example in FIG. 1.

In FIG. 3, the control module 41 has a sensor 5 placed on the limiting cover 3. In FIG. 3, There is a conductive path 221 for connecting the control module 41 with the light source 4 placed in the first container 22. The top rim 12 conceals the back side of the lighting apparatus when being installed.

Figure 4:
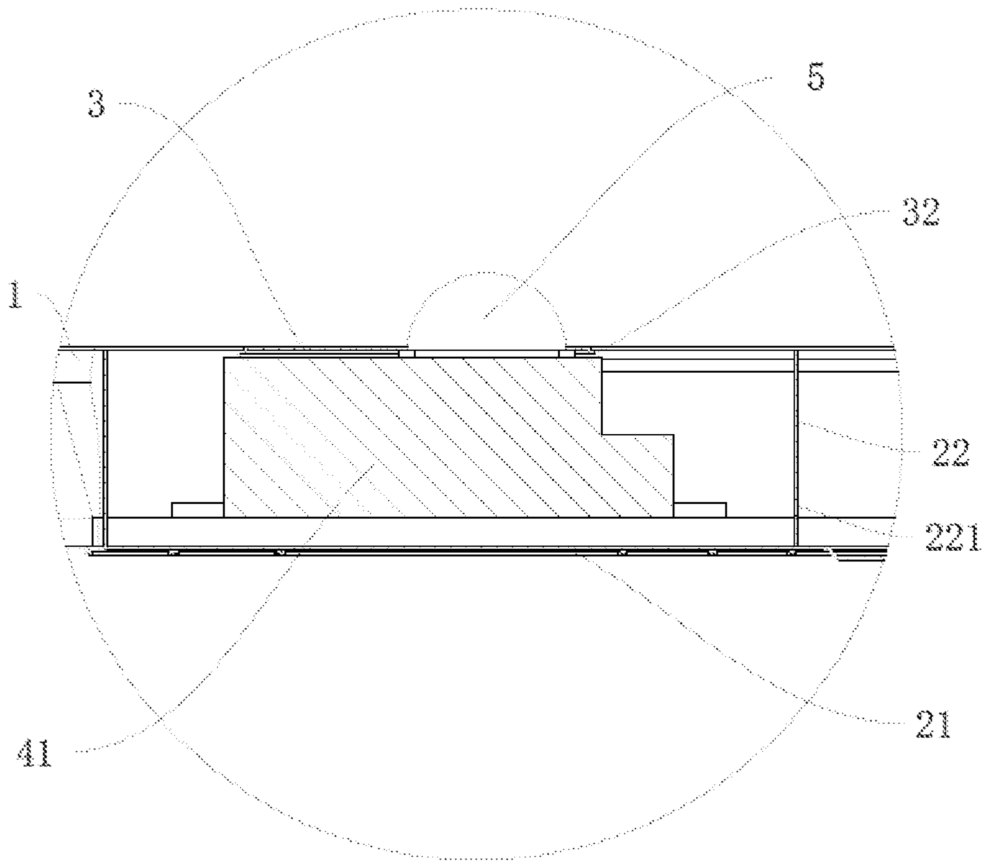
FIG. 4 shows a zoom-up view of the sensor.

FIG. 4 shows a zoom-up view of the area A in FIG. 3.

In FIG. 4, the sensor 5 is placed above a hole 32 to be connected to the control module 41.

FIG. 5 shows a connecting position of the light passing plate 6 and the base plate 12. There are multiple grooves 122, 121 formed by the protruding structures 124, 123 for applying glue to fix the light passing plate 6 with the base plate 12.

Figure 6:
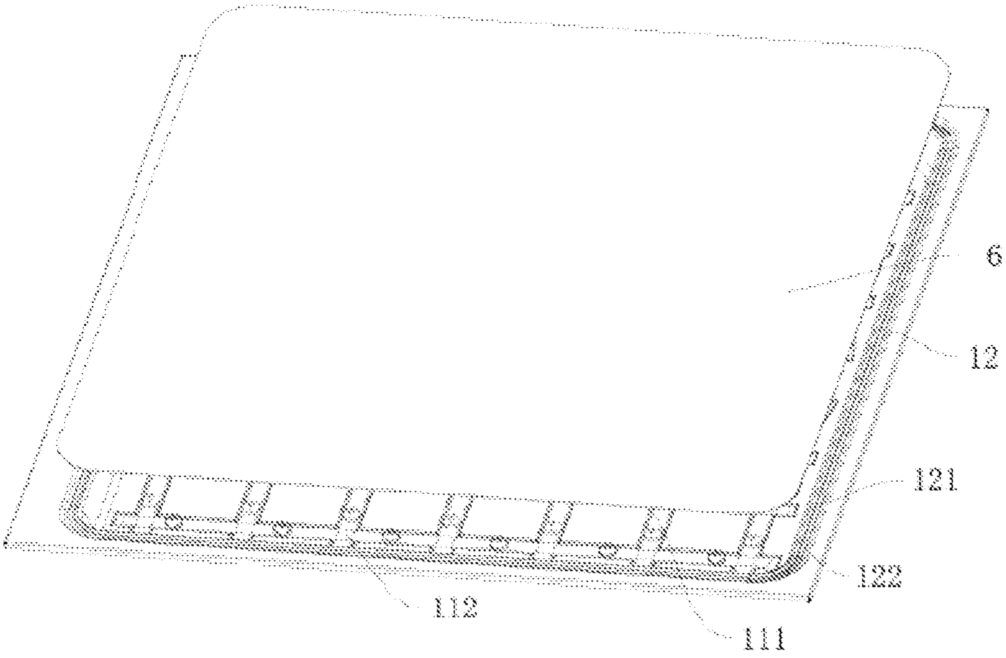
FIG. 6 shows a diffusion plate and a bottom plate with horizontal and vertical rim bars.

FIG. 6 shows a perspective view to explain the concept of FIG. 5. The same reference numerals refer to the same components and are not repeated for brevity.

FIG. 7 shows multiples grooves 112 are used for placing light strips 111. In this example, the grooves are not arranged evenly for providing various combinations to place light strips. For example, there may be 10 light strips or 12 light strips to be placed. The arrangement allows light strips to be placed evenly with different number of light strips.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light source;

a base plate having a lateral wall, a bottom plate, and a top rim, wherein the lateral wall and the bottom plate form a concave container, wherein the light source is disposed on the bottom plate, wherein a bottom edge of the lateral wall is connected to the bottom plate, a top edge of the lateral wall is connected to the top rim;

a light passing plate attached to the top edge of the lateral wall; and a control module, wherein the control module has a sensor and a control circuit, the sensor and the control circuit are placed on two sides of the top rim, the control circuit is connected to the sensor via a through hole of the top rim, wherein the bottom plate has multiple parallel grooves with a same elongated shape for selectively disposing multiple light strips of the light source, wherein a portion of the grooves are not disposed with light strips so that users may select different number of light strips to different subsets of grooves to get different luminance levels of the lighting apparatus, wherein the top edge of the lateral wall has multiple protruding structures forming more than one grooves for containing glue used for attaching the light passing plate and the bottom plate.

2. The lighting apparatus of claim 1, wherein the light passing plate is a diffusion plate for diffusing a light of the light source.

3. The lighting apparatus of claim 1, wherein the light passing plate has multiple lenses corresponding to multiple LED modules of the light source placed respectively below the multiple lenses.

4. The lighting apparatus of claim 1, wherein the grooves are spaced evenly.

5. The lighting apparatus of claim 1, wherein the base plate is made of plastic material.

6. The lighting apparatus of claim 5, wherein the base plate is a single plastic unit made via a manufacturing process.

7. The lighting apparatus of claim 1, wherein the control module is placed in a driver box, the driver box is attached outside the lateral wall, the driver box and the light source are placed on two sides of the lateral wall.

8. The lighting apparatus of claim 7, wherein a through hole is disposed on the base plate for disposing a conductive path to electrically connect the control module and the light source, wherein the control module has a power circuit for providing a driving current to the light source.

9. The lighting apparatus of claim 7, wherein the driver box is a container formed on the base plate.

10. The lighting apparatus of claim 1, wherein a manual switch is placed aside the sensor, wherein the manual switch and the control circuit are placed on two sides of the top rim.

11. The lighting apparatus of claim 10, wherein the manual switch has a rotation switch for continuously adjust a light intensity of the light source.

12. The lighting apparatus of claim 11, wherein the manual further has a second switch for adjusting a light parameter of the light source.

13. The lighting apparatus of claim 12, wherein the rotation switch is combined with the second switch to form a combination selection to control the light source.

14. The lighting apparatus of claim 1, wherein the sensor is placed above a through hole of a limiting cover, the limiting cover is placed on a rim hole of the top rim for keeping the sensor and the control circuit on two sides of the top rim.

15. The lighting apparatus of claim 1, wherein the light passing plate is a rectangular plate with four round corners.

* * * * *